United States Patent
Zhao

(10) Patent No.: US 10,054,847 B1
(45) Date of Patent: Aug. 21, 2018

(54) ANGULARLY ROTARY PROJECTOR

(71) Applicant: Hui Zhao, Guangdong (CN)

(72) Inventor: Hui Zhao, Guangdong (CN)

( * ) Notice: Subject to any disclaimer, the term of this patent is extended or adjusted under 35 U.S.C. 154(b) by 0 days.

(21) Appl. No.: 15/586,306

(22) Filed: May 4, 2017

(51) Int. Cl.
  *G03B 21/14* (2006.01)
  *H04N 9/31* (2006.01)

(52) U.S. Cl.
  CPC ......... *G03B 21/145* (2013.01); *H04N 9/3173* (2013.01)

(58) Field of Classification Search
  CPC .... G03B 21/10; G03B 21/142; G03B 21/145; H04N 9/3141; H04N 9/3176
  See application file for complete search history.

(56) References Cited

U.S. PATENT DOCUMENTS

| | | | | |
|---|---|---|---|---|
| 9,134,598 B2 * | 9/2015 | Zheng | | G03B 21/28 |
| 2003/0189694 A1 * | 10/2003 | Yamada | | G03B 21/10 353/77 |
| 2010/0128228 A1 * | 5/2010 | Matsuo | | G03B 21/30 353/34 |
| 2011/0096303 A1 * | 4/2011 | Horii | | G03B 21/16 353/119 |
| 2012/0140188 A1 * | 6/2012 | Yasuda | | H04N 9/3161 353/69 |
| 2017/0104965 A1 * | 4/2017 | Kadotani | | H04N 9/3144 |

* cited by examiner

*Primary Examiner* — Sultan Chowdhury

(57) ABSTRACT

An angularly rotary projector includes a first housing, a rotating unit and a second housing, characterized in that the first housing is mutually connected with the second housing through the rotating unit; the rotating unit includes a main shaft, a fixed lateral plate and a movable lateral plate; the fixed lateral plate on the rotating unit is fixed in the first housing; the movable lateral plate on the rotating unit is fixed in the second housing; the first housing and the second housing are angularly adjusted by using the rotating unit; the rotating unit is installed on one side of each one of the first housing and the second housing, and a fitting unit is disposed on the other side of each one of the first housing and the second housing.

5 Claims, 3 Drawing Sheets

ANGULARLY ROTARY PROJECTOR

BACKGROUND OF THE INVENTION

1. Technical Field

The present invention belongs to the field of electronic products, and provides a split-type projector, specifically an angularly rotary projector of which the joint between two housings is designed with a rotating unit.

2. Description of Related Art

A projector is an electric appliance which projects light converted from externally provided video signals. Such light projected on a screen is converted from the light provided by a light source of a light installed in the projector and projection images supplied by a display. The projector can be connected with computers, VCD, DVD, BD, game machines, DV, etc. through different interfaces to display corresponding video signals. Projectors are widely used in houses, offices, schools and entertaining places. In order to achieve the best projection effects at different places, certain requirements are imposed on the placement position, angle and height of the projector. The traditional projectors do not take those aspects into consideration, the majority of which are fixed square structures and fail to perform projection at different places, or users are required to use extra supports to fix and place the projectors. Thus, the traditional projectors are not portable and convenient. Meanwhile, the traditional projectors are of an integrated design, so the product repair and parts replacement are very complicated and troublesome.

BRIEF SUMMARY OF THE INVENTION

Aiming at the defects of existing traditional projectors, it needs to design a split-type projector which has a rotating unit at the joint, so that the play angle can be controlled and regulated when the product is used. The angularly rotary projector of the present invention has features of simple structure, convenient repair, angular regulation, easy installation and dismantling, convenient use, wide applicable scope, etc.

To solve the above technical problems, the present invention employs the following solution.

An angularly rotary projector comprises a first housing, a rotating unit and a second housing, characterized in that the first housing is mutually connected with the second housing through the rotating unit; the rotating unit comprises a main shaft, a fixed lateral plate and a movable lateral plate; the fixed lateral plate on the rotating unit is fixed in the first housing; the movable lateral plate on the rotating unit is fixed in the second housing; the first housing and the second housing are angularly adjusted by using the rotating unit; the rotating unit is installed on one side of each one of the first housing and the second housing, and a fitting unit is disposed on the other side of each one of the first housing and the second housing.

Preferably, the rotating unit also comprises a limiting ring, a first cushion, an angle limiting plate, a force regulating spring plate, a second cushion, a third cushion and a nut, characterized in that the rotating unit is formed by assembling the main shaft, the fixed lateral plate, the limiting ring, the first cushion, the movable lateral plate, the angle limiting plate, the force regulating spring plate, the second cushion, the third cushion and the nut in turn; one end of the main shaft of the rotating unit is provided with screw threads matched with the nut; the other end of the main shaft is provided with a limiting structure; the rear end of the main shaft is designed with an anti-rotating structure which is consistent with an inner hole of the fixed lateral plate; after installation, the fixed lateral plate is embedded and fixed with the main shaft; the fixed lateral plate is provided with a structural hole which is used for fixing the first housing, thus fixing the rotating unit in the first housing; the limiting ring in the rotating unit controls the distance between the movable lateral plate and the fixed lateral plate; the movable lateral plate is provided with an inner hole in which the main shaft is inserted and can rotate, and the movable lateral plate is provided with a structural hole which is used for fixing the second housing.

Preferably, the movable lateral plate is provided with a protruding structure on the lateral side; the angle limiting plate is externally provided with a segment-limiting gap; when the protruding structure on the lateral side of the movable lateral plate fits with the angle limiting plate, the segment-limiting gap on the angle limiting plate plays the role of fixing the angle and enables the movable lateral plate to rotate in a certain angle.

Preferably, cushions and the force regulating spring plate are disposed between the nut and the movable lateral plate of the rotating unit to regulate the rotating force of the rotating shaft and avoid abrasion between the first housing and the second housing during rotation.

Preferably, the first housing is connected with the second housing through the rotating unit, and the second hosing regulates the angle and is fixed by the effect of the limiting ring, angle limiting plate and force regulating spring plate on the rotating unit.

Preferably, the fitting units are magnetic fitting units disposed in the first housing and in the second housing.

DETAILED DESCRIPTION OF THE INVENTION

In view of the above detects in the prior art, the technical problems to be solved by the present invention is to provide a split-type projector, specifically to provide an angularly rotary projector of which the joint between two housings is designed with a rotating unit, to overcome the defects in the prior art.

Figure 1:
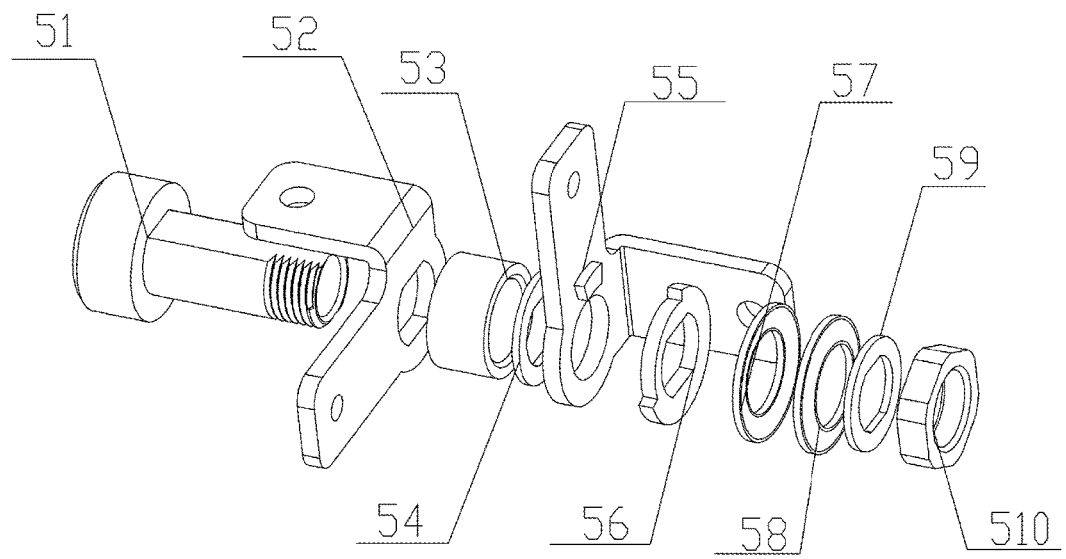
FIG. 1 is a schematic view 1 of a rotating unit provided by the present invention.
Figure 2:
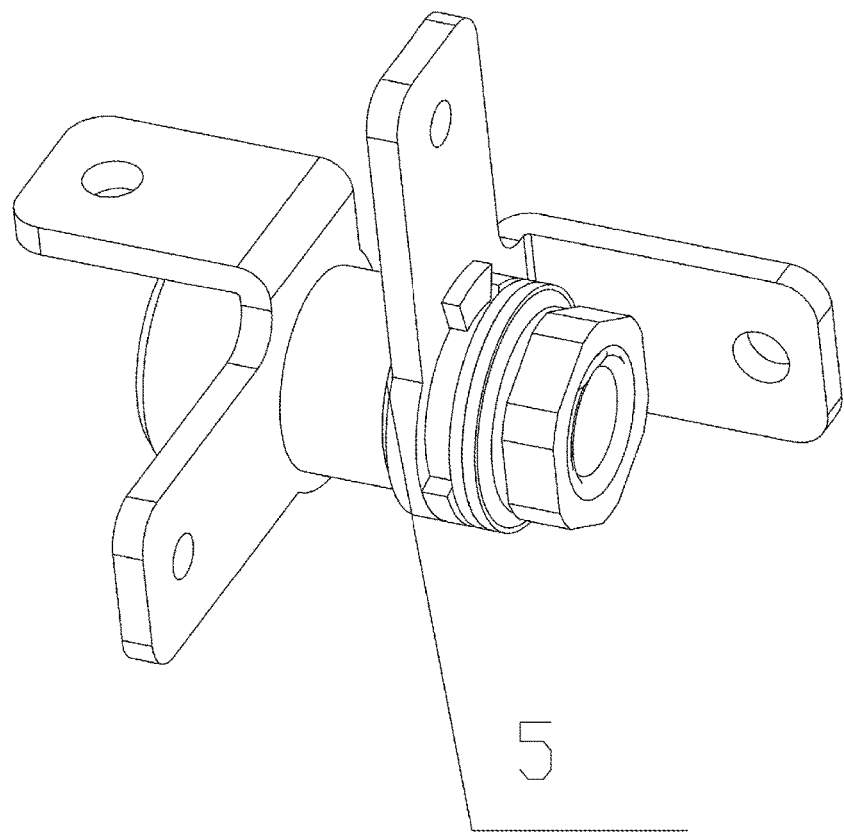
FIG. 2 is schematic view 2 of the rotating unit provided by the present invention.
Figure 3:
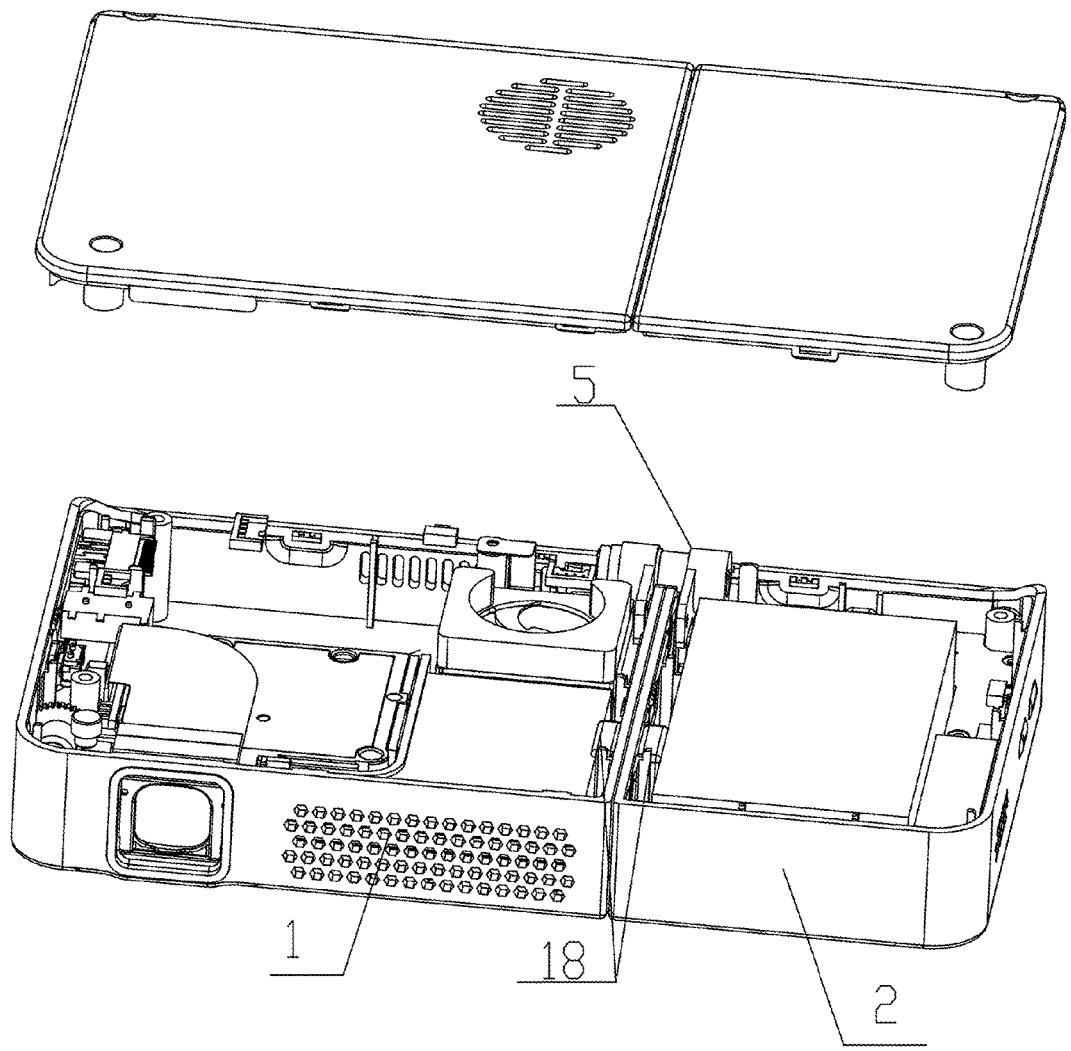
FIG. 3 is a schematic view 1 of an angularly rotary projector of the present invention.
Figure 4:
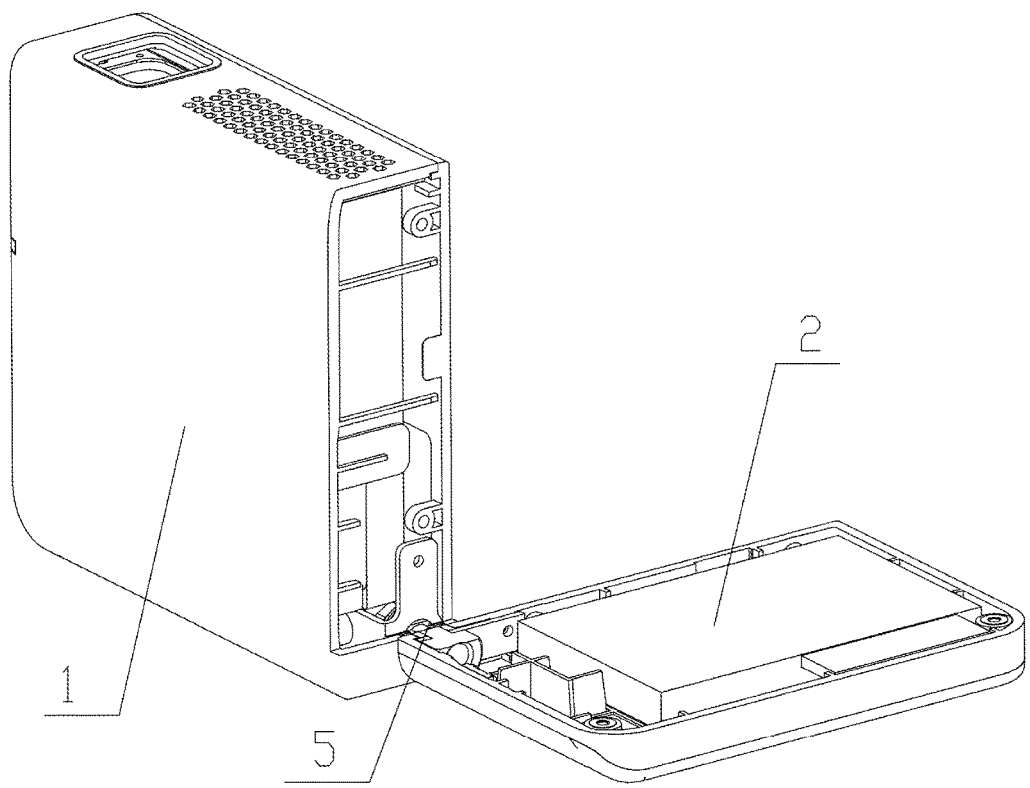
FIG. 4 is a schematic view 2 of the angularly rotary projector of the present invention.

As shown in FIGS. 1-4, an angularly rotary projector includes a first housing 1, a rotating unit 5 and a second housing 2, characterized in that the first housing 1 is mutually connected with the second housing 2 through the rotating unit 5; the rotating unit 5 includes a main shaft 51, a fixed lateral plate 52 and a movable lateral plate 55; the first housing 1 is internally provided with a structural clamping groove in which one end of the rotating unit 5 is fixed; the fixed lateral plate 52 on the rotating unit 5 is fixed in the first housing 1; the second housing 2 is internally provided with a structural clamping groove in which one end of the rotating unit 5 is fixed; the movable lateral plate 55 on the rotating unit is fixed in the second housing; the first housing 1 and the second housing 2 are angularly adjusted by using the rotating unit 5; the rotating unit 5 is installed on one side of each one of the first housing 1 and the second housing 2, and a fitting unit 18 is disposed on the other side of each one of the first housing 1 and the second housing 2.

Preferably, the rotating unit 5 also includes a limiting ring 53, a first cushion 54, an angle limiting plate 56, a force regulating spring plate 57, a second cushion 58, a third cushion 59 and a nut 510, characterized in that the rotating unit is formed by assembling the main shaft 51, the fixed lateral plate 52, the limiting ring 53, the first cushion 54, the movable lateral plate 55, the angle limiting plate 56, the force regulating spring plate 57, the second cushion 58, the third cushion 59 and the nut 510 in turn; one end of the main shaft 51 of the rotating unit 5 is provided with screw threads matched with the nut 510; the other end of the main shaft 51 is provided with a limiting structure; the rear end of the main shaft 51 is designed with an anti-rotating structure which is consistent with an inner hole of the fixed lateral plate 52; after installation, the fixed lateral plate 52 is embedded and fixed with the main shaft 51; the fixed lateral plate is provided with a structural hole which is used for fixing the first housing 1, thus fixing the rotating unit in the first housing; the limiting ring 53 in the rotating unit controls the distance between the movable lateral plate 55 and the fixed lateral plate 52; the movable lateral plate 53 is provided with an inner hole in which the main shaft 51 is inserted and can rotate, and the movable lateral plate 53 is provided with a structural hole which is used for fixing the second housing 2.

Preferably, the movable lateral plate 55 is provided with a protruding structure on the lateral side; the angle limiting plate 56 is externally provided with a segment-limiting gap; when the protruding structure on the lateral side of the movable lateral plate 55 fits with the angle limiting plate 56, the segment-limiting gap on the angle limiting plate 56 plays the role of fixing the angle and enables the movable lateral plate 56 to rotate in a certain angle.

Preferably, a plurality of cushions and the force regulating spring plate 57 are disposed between the nut 510 and the movable lateral plate 55 of the rotating unit 5 to regulate the rotating force of the main shaft 51 and avoid abrasion between the first housing 1 and the second housing 2 during rotation.

Preferably, the first housing 1 is connected with the second housing 2 through the rotating unit 5, and the second housing 2 regulates the angle and is fixed by the effect of the angle limiting plate 56 and force regulating spring plate 57 on the rotating unit 5.

Preferably, the fitting units 18 are magnetic fitting units disposed in the first housing 1 and in the second housing 2; when one end of the first housing 1 is connected with one end of the second housing 2 through the rotating unit 5, the other ends of the first housing and the second housing tend to generate different clearances; by installing a groove structure at the other end of each one of the first housing 1 that contacts the second housing 2 and installing the magnetic fitting units in the groove structure, the first housing 1 and the second housing 2 tightly fit with each other, further improving the integrity and elegance of the product.

A preferable specific embodiment of the present invention is described above. It should be understood that those ordinarily skilled in the art can make various modifications and changes according to the concept of the present invention without creative labor. Therefore, all technical solutions obtained by those skilled in the art through logical analysis, reasoning or limited experiments according to the concept of the present invention and on the basis of the prior art should fall within the protective scope of the Claims.

What is claimed is:

1. An angularly rotary projector, comprising a first housing, a rotating unit and a second housing, characterized in that the first housing is mutually connected with the second housing through the rotating unit; the rotating unit comprises a main shaft, a fixed lateral plate and a movable lateral plate; the fixed lateral plate on the rotating unit is fixed in the first housing; the movable lateral plate on the rotating unit is fixed in the second housing; the first housing and the second housing are angularly adjusted by using the rotating unit; the rotating unit is installed on one side of each one of the first housing and the second housing, and a fitting unit is disposed on the other side of each one of the first housing and the second housing; wherein the rotating unit also comprises a limiting ring, a first cushion, an angle limiting plate, a force regulating spring plate, a second cushion, a third cushion and a nut; characterized in that, the rotating unit is formed by assembling the main shaft, the fixed lateral plate, the limiting ring, the first cushion, the movable lateral plate, the angle limiting plate, the force regulating spring plate, the second cushion, the third cushion and the nut in turn; one end of the main shaft of the rotating unit is provided with screw threads matched with the nut; the other end of the main shaft is provided with a limiting structure; the rear end of the main shaft is designed with an anti-rotating structure which is consistent with an inner hole of the fixed lateral plate; after installation, the fixed lateral plate is embedded and fixed with the main shaft; the fixed lateral plate is provided with a structural hole which is used for fixing the first housing, thus fixing the rotating unit in the first housing; the limiting ring in the rotating unit controls the distance between the movable lateral plate and the fixed lateral plate; the movable lateral plate is provided with an inner hole in which the main shaft is inserted and is capable of rotating, and the movable lateral plate is provided with a structural hole which is used for fixing the second housing.

2. The angularly rotary projector according to claim 1, wherein the movable lateral plate is provided with a protruding structure on the lateral side; the angle limiting plate is externally provided with a segment-limiting gap; when the protruding structure on the lateral side of the movable lateral plate fits with the angle limiting plate, the segment-limiting gap on the angle limiting plate plays the role of fixing the angle and enables the movable lateral plate to rotate in a certain angle.

3. The angularly rotary projector according to claim 1, wherein the cushions and the force regulating spring plate are disposed between the nut and the movable lateral plate of the rotating unit to regulate the rotating force of the rotating shaft and avoid abrasion between the first housing and the second housing during rotation.

4. The angularly rotary projector according to claim 1, wherein the first housing is connected with the second housing through the rotating unit, and the second housing regulates the angle and is fixed by the effect of the limiting ring, angle limiting plate and force regulating spring plate on the rotating unit.

5. The angularly rotary projector according to claim 1, wherein the fitting unit is a magnetic fitting unit disposed in the first housing and in the second housing.

\* \* \* \* \*